United States Patent [19]

Nelson et al.

[11] Patent Number: 5,271,873
[45] Date of Patent: Dec. 21, 1993

[54] SUPPORT OF INTERSPACED, OPPOSED FEED HEADERS FOR FGD SYSTEMS

[75] Inventors: Norman D. Nelson, Akron; Edward J. Piaskowski, Massillon, both of Ohio

[73] Assignee: The Babcock & Wilcox Company, New Orleans, La.

[21] Appl. No.: 886,581

[22] Filed: May 21, 1992

[51] Int. Cl.$^5$ .................................. B01F 3/04
[52] U.S. Cl. ..................................... 261/116
[58] Field of Search .............. 261/116, 117; 428/68.1

[56] References Cited

U.S. PATENT DOCUMENTS

| | | | |
|---|---|---|---|
| 2,863,625 | 12/1958 | Attwood | 248/68.1 |
| 3,226,069 | 12/1965 | Clarke | 248/68.1 |
| 4,378,923 | 4/1983 | Takei | 248/68.1 |
| 4,395,009 | 7/1983 | Bormke | 248/68.1 |
| 5,002,244 | 3/1991 | Holbury et al. | 248/68.1 |
| 5,044,584 | 9/1991 | Lin | 248/68.1 |
| 5,141,186 | 8/1992 | Cusic | 248/68.1 |
| 5,173,093 | 12/1992 | Johnson et al. | 261/117 |

Primary Examiner—Tim Miles
Attorney, Agent, or Firm—Robert J. Edwards; Michael L. Hoelter

[57] ABSTRACT

A method and apparatus for supporting headers within a tower from adjacent headers thereby reducing the amount of support members needed. In this configuration, the headers, which extend from opposing sides of the tower, are interspaced within the same generally horizontal plane in the tower. Support for the cantilevered end of each header is supplied by the self-supporting capabilities of adjacent headers near their support point with the tower wall. This significantly reduces the loaded span of support members to the distance between such adjacent headers as well as reduces the load upon such support member.

17 Claims, 1 Drawing Sheet 5,271,873

SUPPORT OF INTERSPACED, OPPOSED FEED HEADERS FOR FGD SYSTEMS

FIELD OF THE INVENTION

This invention pertains to a means of supporting headers within a flue gas desulfurization (FGD) system and more particularly to a means of providing support to opposing headers that are interspaced within the same generally horizontal plane.

BACKGROUND OF THE INVENTION

Most headers in the absorber tower of a flue gas desulfurization (FGD) system are supported by means of a series of beams or trusses that span across the tower cross section. These headers are either supported on top of such members or they are suspended below such members by a hanger system. Additionally, when these headers incorporate branch lines, the branch lines must also be supported such as by a series of secondary beams that likewise extend across or within the tower cross section.

Normally, the load upon these support members is quite high and their unsupported span length is quite long. Consequently, these support members often consist of structural I-beams that, because of their size and weight, further increase both the loading upon and the height of the absorber tower. Furthermore, the resulting criss-cross pattern of support members within the absorber tower also restricts flue gas flow through the tower. Additionally, in the situation where the headers are supported on top of these support members within the tower, the depth of these members oftentimes blocks or otherwise interferes with the spray pattern emitted from the nozzles supplied by the supported headers.

It is thus an object of this invention to provide a means of supporting headers within an absorber tower that does not rely upon large, heavy support members for support. An additional object of this invention is to provide a means of header support that does not restrict flue gas flow. A further object of this invention is to provide header support that does not interfere with the nozzle spray pattern within the tower. These and other objects of this invention will become obvious upon further investigation.

SUMMARY OF THE INVENTION

This invention pertains to a method and apparatus of supporting headers within an absorber tower. The method steps include installing headers from opposite sides of the tower that extend across the tower cross section. Each such header incorporates a supply region adjacent its support point with the tower wall and an opposite end region that is cantilevered or spaced from this support point and which terminates near the opposite wall. These opposing headers are interspaced or staggered with each other and generally extend within the same plane such that an end region of a first header is located adjacent a supply region of a second oppositely extending header. A support member is then secured to at least one, and generally to more than one, supply region of the alternating headers in the tower thereby supporting this support member. In turn, this support member spans across one or more end regions of the intermediate headers thus supporting these adjacent end regions from this support member and hence from the supply regions.

DETAILED DESCRIPTION OF THE DRAWINGS

Figure 1:
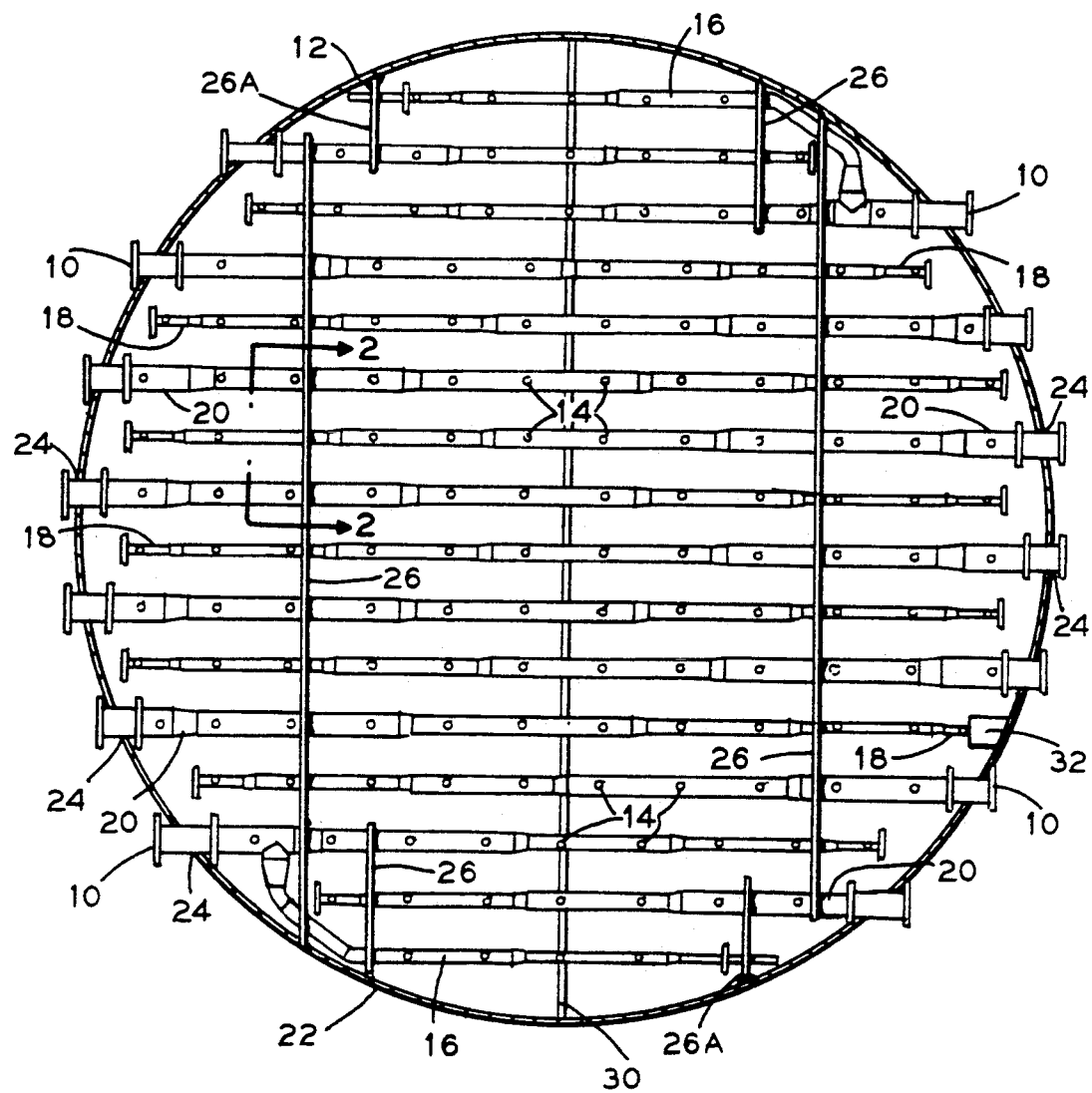
FIG. 1 is a schematic plan view of an absorber tower with interspaced or staggered headers therein and the manner of their support.

Referring to the drawings, there is shown in FIG. 1 a plan view of a series of interspaced or staggered headers 10 that project or extend into absorber tower 12. As shown, these headers 10 are configured to extend within the same general plane within tower 12 in order to spray and thereby fully saturate the upwardly flowing flue gas. There may be more than one such plane within tower 12 or there may only be one such plane, depending upon the design requirements of tower 12.

As can be seen, headers 10 from one side of tower 12 are interspaced or staggered with headers 10 from an opposite or opposing side of tower 12. As each of these headers 10 extend within tower 12, their diameter decreases due to the reduced flow through that portion of header 10. This enables the flow rates within each header 10 to remain relatively consistent along its length in order to provide a spray solution at a generally constant flow to each of nozzles 14. In some cases, a branch line 16 projects from a header 10 to provide coverage to a different region of tower 12.

Due to this configuration, each header 10 in this embodiment has a small cantilevered end region 18 and an opposite larger supply region 20. Each such header 10 projects through tower wall 20 which provides support thereto via support point 24. As a result, each cantilevered header 10 is capable of a considerable amount of self-support. Generally, such headers 10 require additional support only for their smaller cantilevered end region 18 since its respective, and larger, supply region 20 is supported via support point 24. Thus, only unsupported end regions 18 or headers with very long spans generally require support in addition to that provided by support point 24 of tower wall 22.

Figure 2:
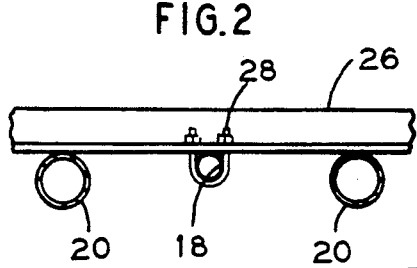
FIG. 2 is a sectional side view, partially broken away, taken along lines 2—2 of FIG. I.

Preferably, support for each end region 18 is provided by installing a beam 26 across the supply region 20 of neighboring headers 10 near their support point 24 (see FIG. 2). This beam 26 may or may not be attached to wall 22 as desired since the respective supply regions 20 generally provide sufficient enough support to beam 26 without the need to also secure beam 26 to wall 22. In some cases or configurations, however, such as when beam 26 supports a branch line 16, beam 26 could, and probably should, be attached to wall 22 for additional support and security. Additionally, when supply regions 20 are lacking on both sides of the cantilevered end region 18 to-be-supported, such as in the case of beam 26A, one end of this beam 26A is usually secured to wall 22. On the other hand, it may be possible to support such end regions 18 by merely configuring beam 26 to cantilever or extend out from its respective support region 20 without tying into wall 22.

Intermediate these supply regions 20, beam 26 generally provides support to its respective end regions 18 by suspending each end region 18 underneath as illustrated in FIG. 2. Hangers 28 extend around end region 18 and secures it to beam 26. Hangers 28 may be U-bolts or hangers 28 may consist of other structural components configured for attachment between beam 26 and end region 18. Furthermore, Beam 26 is generally not firmly secured to supply region 20 and instead is free to slide along supply region 20. This allows for differential expansions between regions 20 and 18 extending from opposite sides of tower wall 22.

As can be seen, beam 26 rests upon an upper portion of the supply regions 20 of headers 10 which, due to their proximity to wall support point 24, provide the support needed for beam 26. Thus, the loading upon beam 26 is distributed to supply region 20 of header 10 and thence to its support point 24 within wall 22 of tower 12. Consequently, the actual loaded span of beam 26 is the distance between the supply regions 20 of two adjacent headers entering tower 12 through wall 22 rather than the entire span across tower 12. This arrangement enables pairs of supply regions 20 of headers 10 to support their respective intermediate end region 18 of headers 10 that extend from the opposite or opposing side of tower 12. It also permits the use of smaller beams since the loading upon each beam 26 is minimal and the unsupported span of each beam 26 is significantly reduced.

By reducing the size and number of beams 26 required to support headers 10, there is less congestion within tower 12 and greater flow area for the upwardly flowing flue gas. This will reduce the pressure drop occurring within tower 12 thereby making it more efficient. Additionally, such smaller beams 26 will create less interference with the spray from nozzles 14 and such beams 26 will be less costly to purchase and install. Also, by reducing support beam depth, spray impingement upon the various beams 26 is virtually eliminated thereby solving the problem of erosion which arises whenever nozzles 14 spray directly onto support beams 26. Furthermore, by this arrangement, any uneven expansion or contraction of headers 10 or beams 26 can be accommodated without creating excessive stresses or strains within tower 12 since beams 26 are movable, slightly, with respect to headers 10.

Figure 3:
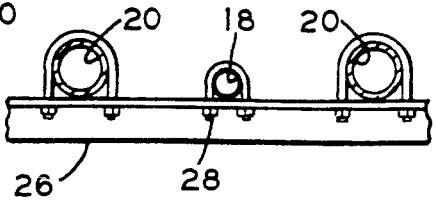
FIG. 3 is a sectional view, partially broken away, taken along lines to 2—2 of FIG. 1, but illustrating an alternate embodiment of the invention.

An alternate embodiment of this invention as shown in FIG. 3 pertains to support beams 26 being secured to an underneath side (as compared to an upper side) of adjacent supply regions 20 with each respective intermediate end region 1 being supported on top of such beams 26. In this embodiment, beam 26 would be suspended or hung from supply regions 20 while providing support to the respective intermediate end region 18. Again, the loading from end region 18 would pass through beam 26 and thence to supply region 20 which, in turn, would transfer this loading to adjacent tower wall 22 via their respective support points 24.

On very large diameter towers when the span between the two support beams 26 is too great for headers 10 to span, either a single or multiple beams 30 can be added that span across the full tower 12 in order to support headers 10.

Also, when the cantilevered length or region 18 becomes to great, support shelves 32 can be added to tower wall 22 to provide the necessary support.

What is claimed is:

1. A method of supporting headers within a tower comprising the steps of:

(a) installing headers that extend within the tower from opposing sides of the tower, each said header being supported by the tower at a support point and having a supply region adjacent said support point and an opposite end region spaced or cantilevered from said support point, said headers being interspaced and extending generally within the same plane within the tower such that an end region of a first header is located adjacent a supply region of a second or neighboring header;

(b) securing a support member to at least one said supply region thereby supporting said support member from said supply region, said support member spanning across at least one said end region; and, (c) supporting said end region from said support member.

2. The method as set forth in claim 1 wherein said supporting step comprises hanger means for supporting said end region via said support member.

3. The method as set forth in claim 2 wherein one end of said support member is secured to the tower wall with an opposite portion of said support member being supported by a said supply region of a said header.

4. The method as set forth in claim 2 wherein said support member spans across a plurality of said supply regions.

5. The method as set forth in claim 4 wherein said support member rests upon an upper portion of a said supply region.

6. The method as set forth in claim 5 wherein said end region is suspended underneath said support member.

7. The method as set forth in claim 4 wherein said support member is suspended from a lower portion of a said supply region.

8. The method as set forth in claim 7 wherein said end region is supported or rests upon said support member.

9. A hanging apparatus for supporting headers within a tower comprising:

(a) interspaced headers extending into the tower from opposing sides of the tower, said headers being located in the same generally horizontal plane within the tower with each said header having a supply region adjacent its support point with the tower wall and an opposite end region spaced from said support point; and, (b) support means for supporting a said end region of a first said header from at least one said supply region of an adjacent second said header, said first and second headers extending from opposing sides of the tower.

10. The apparatus as set forth in claim 9 wherein said support means comprises a support member that is attached to at least one supply region of said second header and supports said end region of said first header.

11. The apparatus as set forth in claim 10 wherein said support means comprise hanger means for supporting said end region via said support member.

12. The apparatus as set forth in claim 11 wherein one end of said support member is secured to the tower wall with an adjacent portion of said support member being supported by a said supply region of a said header.

13. The apparatus as set forth in claim 11 wherein said support member spans across a plurality of said supply regions.

14. The apparatus as set forth in claim 13 wherein said support member rests upon an upper portion of a said supply region.

15. The apparatus as set forth in claim 14 wherein said end region is suspended underneath said support member.

16. The apparatus as set forth in claim 13 wherein said support member is suspended from a lower portion of a said supply region.

17. The apparatus as set forth in claim 16 wherein said end region is supported or rests upon said support member.

* * * * *